A. SWANSON.
POWER TRANSMITTING MECHANISM.
APPLICATION FILED MAR. 29, 1913.

1,128,545.

Patented Feb. 16, 1915.
2 SHEETS—SHEET 1.

WITNESSES
Howard D. Orr.
F. T. Chapman.

August Swanson, INVENTOR,
BY E. G. Siggers
ATTORNEY

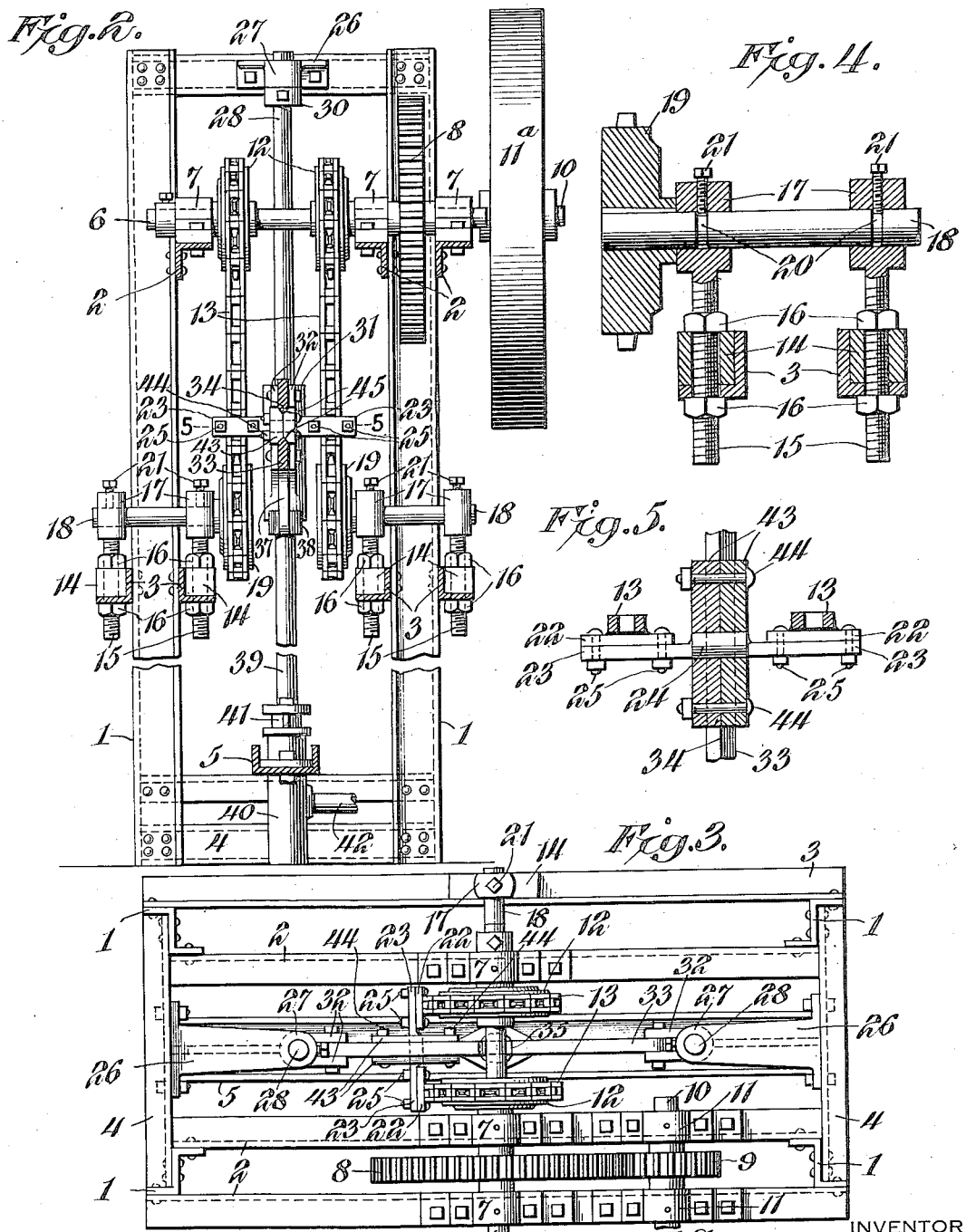

UNITED STATES PATENT OFFICE.

AUGUST SWANSON, OF CEDAR RAPIDS, IOWA.

POWER-TRANSMITTING MECHANISM.

1,128,545.　　　　　Specification of Letters Patent.　　Patented Feb. 16, 1915.

Application filed March 29, 1913.　Serial No. 757,626.

*To all whom it may concern:*

Be it known that I, AUGUST SWANSON, a citizen of the United States, residing at Cedar Rapids, in the county of Linn and State of Iowa, have invented a new and useful Power-Transmitting Mechanism, of which the following is a specification.

This invention has reference to power transmitting mechanism and while especially adapted for operating pumps may be used in whole or in part in other connections.

The object of the present invention is to provide a mechanism whereby rotary motion may be converted into an elongated reciprocatory motion of any desired extent of travel.

In accordance with the present invention there is provided a drive shaft imparting motion to sprocket chains or other like devices, which sprocket chains may be as long as wanted and are passed around idlers at the desired distance from the driving mechanism, said sprocket chains being spaced apart and connected at a convenient point by a member carrying a slidable block traveling in a slidable frame mounted upon guides, so as to have reciprocatory movement only, the block being capable of lateral movement in the frame to an extent agreeable to the spacing apart of the different runs of the chains, the latter being endless. The frame is so constructed that it may pass the drive shaft, and the frame and block or traveler therein are so mounted and their engaging parts are so made that the traveler may move laterally with respect to the direction of movement of the frame without liability of lost motion, thus providing a markedly silent arrangement without any marked friction.

Moreover, the invention contemplates a supporting structure for the mechanism which shall be particularly rigid and at the same time support the reciprocatory frame, so that the driven member connected to the reciprocatory frame shall be free from lateral strains which might otherwise occur, since the driving force is applied to the frame to one side of the longitudinal axis of travel of the driven member.

The invention will be best understood from a consideration of the following detailed description, taken in connection with the accompanying drawings forming a part of this specification, with the further understanding that while the drawings show a practical form of the invention the latter is not confined to any strict conformity with the showing of the drawings, but may be changed and modified so long as such changes and modifications mark no material departure from the salient features of the invention.

Figure 1:
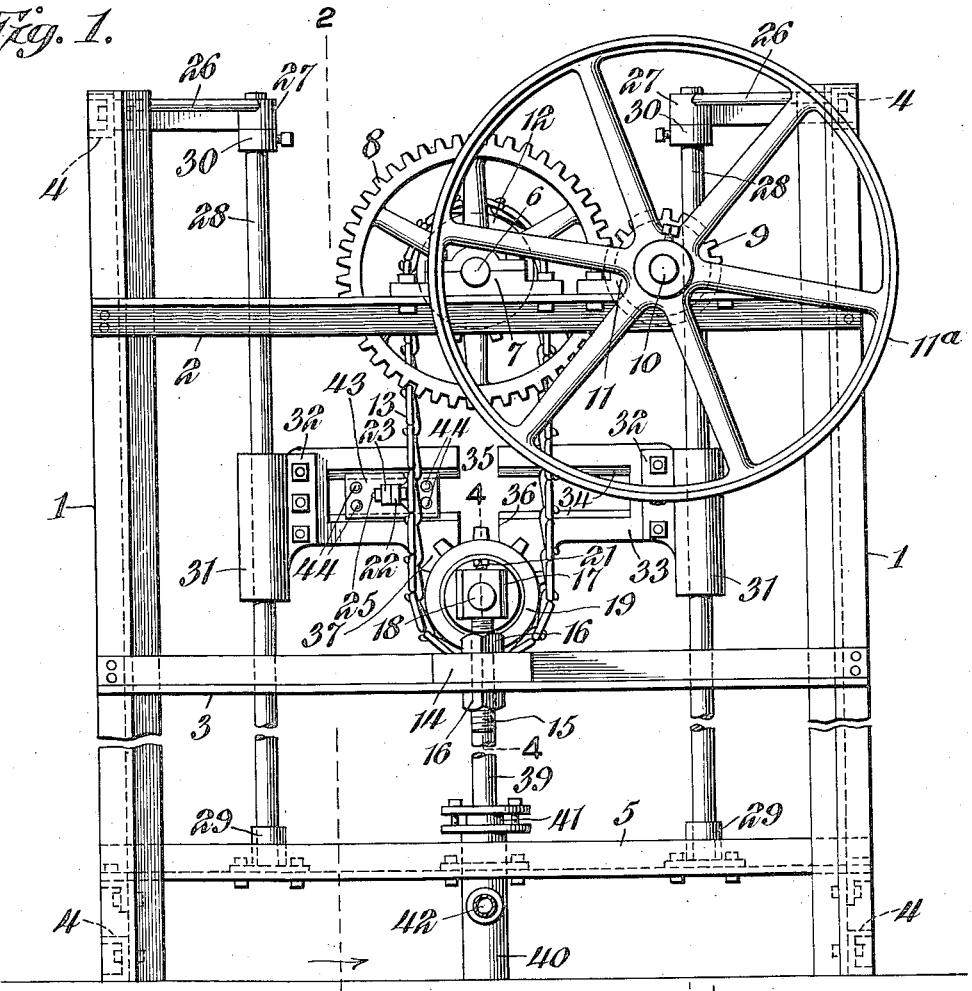
Figure 6:
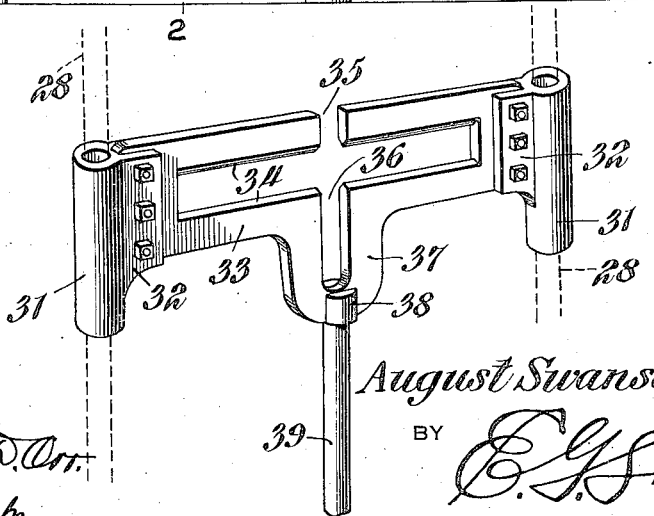

In the drawings:—Figure 1 is a side elevation of the invention as applied to a pump. Fig. 2 is a section on the line 2—2 of Fig. 1. Fig. 3 is a plan view of the structure shown in Fig. 1. Fig. 4 is a section on the line 4—4 of Fig. 1 but drawn to a larger scale. Fig. 5 is a section on the line 5—5 of Fig. 2 but drawn to a larger scale. Fig. 6 is a perspective view of the reciprocatory frame designed to directly actuate the driven member.

In the drawings there is shown a framework made up of corner posts 1 connected together at suitable points by cross beams 2 and 3, respectively, and other cross beams 4 at the ends, the cross beams 2 and 3 being located at the sides of the framework. Certain of the end beams 4 support another beam 5 extending about midway of matching corner posts 1, the frame shown in the drawing being longer in the direction of the beams 2, 3 and 5 than of the beams 4, so that the frame may be described as longer than wide. It is found advisable for purposes of strength and lightness to construct the frame of structural steel and to make the corner beams 1 of Z form, while the other beams may be of L or channel form in accordance with their location. The Z corner beams provide for the arrangement of the beams 2 and 3 in pairs, so that there is a beam 2 exterior to the corner beams and other beams 2 interior thereof, while the beams 3 are located both exterior and interior to the corner posts and serve to support certain structures to be described.

Midway of the supporting frame and extending laterally thereof or in the direction of the width is a shaft 6 mounted in bearings 7 carried by the beams 2, and this shaft has secured to it between two bearings 7 a gear wheel 8 with which meshes a gear pinion 9 on a power shaft 10 having bearings 11 mounted on adjacent beams 2. The shaft 10 carries exterior to the frame a pulley 11ª to which power may be applied by a belt and as it is customary to drive machinery by belt or by direct connection with an electric motor the pulley 11ª may be taken as typical of any suitable driving means.

Mounted on the shaft 6 which extends across the space between the inner beams 2 are two spaced sprocket wheels 12 about each of which there is passed an endless sprocket chain 13.

Mounted upon each beam 3 is a block 14 traversed by a threaded rod 15 having nuts 16 thereon, one above the block 14 and the other below the respective beam 3. These threaded rods each terminate in a head 17 forming a bearing for a shaft 18, which latter is long enough to extend through two adjacent heads 17 and carry a sprocket wheel 19 in line with a respective sprocket wheel 12, there being two shafts 18 and two sprocket wheels 19. Moreover, the sprocket wheels 19 are so located with respect to the sprocket wheels 12 as to be engaged by the respective chains 13, wherefore the sprocket wheels 19 serve as idlers for the chains 13 at such a distance from the sprocket wheels 12 as to hold the chains 13 taut. The shafts 18 may be mounted in the heads 17 in any suitable manner and one such manner of mounting is indicated in the drawings where each shaft 18 is shown as provided with circumferential grooves 20 entered by set screws 21 carried by the heads 17, so that the shafts may turn without longitudinal movement. The threaded rods 15 and the nuts 16 provide a ready means for adjusting the sprocket wheels 19 to or from the sprocket wheels 12 to take up any slack which may occur in the chains 13. At an appropriate point corresponding links of the two chains 13 each carry a block 22 to which a corresponding extension 23 at the ends of a wrist pin 24 is secured by bolts 25 or other suitable means.

The end connecting beams 4 at the upper ends of the posts 1 each carry a bracket 26 bolted or otherwise secured thereto and this bracket terminates in an eye 27 receiving one end of a rod 28, this being the upper end of the rod, while the lower end of the rod enters a socket 29 made fast in the channel beam 5. Each rod 28 is held in place by a set collar 30 which may engage under the eye 27 of the respective bracket 26.

Applied to each rod 28 is an elongated sleeve 31 having at one side elongated ears 32 between which is bolted the corresponding end of a relatively thin and substantially flat frame 33, this frame being in the form of an elongated rectangle permanently closed at the ends and long enough to reach from the ears of one sleeve 31 to the ears of the other sleeve 31. The inner margins or edges of the long sides of the frame are V-shaped, as indicated at 34, the V edge of one long side of the frame being directed toward that of the other long side of the frame. At an intermediate point one long side of the frame 33 is broken by a gap 35 and directly opposite this gap 35 the other long side of the frame is broken by a gap 36, but united by a yoke 37 elongated in a direction perpendicular to the length of the frame. The central portion of the yoke is formed with a receptacle 38 for a pump rod 39, which rod is shown in the drawings as entering a well casing 40 through a packing gland 41, and the well casing is shown with a lateral outlet pipe 42.

The wrist pin 24 centrally traverses a traveler made up of two matching blocks 43 secured together by bolts 44 or otherwise, and shaped on their adjacent edges to form V grooves 45 conforming to the V edges 34 of the long sides of the frame 33, the two members of the block 43 closely embracing the V edges 34 which enter the grooves 45, but not so closely to prevent free movement of the traveler lengthwise of the frame 33 in engagement with the inner edges of the long sides thereof. The wrist pin 24 constrains the traveler 43 to move with it between the sprocket wheels 12 and 19 and around the latter as the chains move progressively in one direction. Since the frame 33 is at all times engaged by the traveler 43 such frame participates in the movements of the sprocket chain and of the traveler except that the frame does not participate in the shifting of the traveler on passing around the sprocket wheels, but this is permitted by the elongation of the frame 33 and the freedom of movement of the traveler lengthwise of the frame within the latter in engagement with the V edges 34. The traveler is of ample length to bridge the gaps 35 and 36, so that at no time is there the liability of the traveler jamming in such gaps.

The shafts 18 terminate at the sprocket wheels 19 and these sprocket wheels are spaced apart a sufficient distance to permit free movement of the frame 33 between them in the direction of the length of the pump rod, but the shaft 6 spans the space between the sprocket wheels 12 so that it would interfere with the movement of the frame 33 were it not for the gaps 35 and 36, and the yoke 37, which permit the movement of the frame 33 by the shaft 6 on reaching this shaft until the shaft enters the yoke 37 to a distance permitting the elevation of the traveler to a height agreeable to the tops of the sprocket wheels 12. The traveler may therefore move up and down with the sprocket chains and laterally from one run to the other of the sprocket chains without interference with the reciprocatory movement of the frame 33, and the pump rod driven thereby. The sleeves 31 travel along the rods 28 which are mounted parallel one to the other and at an ample distance apart so that the application of power to the frame by the travel to one side of the center line thereof defined by the longitudinal axis of the pump rod does not in any manner tend to cause jamming of the frame or excessive friction, but the frame 31 having elongated guiding means on opposite sides permitting no material lateral movement may reciprocate freely to operate the pump rod without bringing any strain thereon which would tend to affect the packing of the pump rod in the packing gland 41.

When the structure is employed for other purposes than that disclosed in the drawings, as, for instance, the driving of a conveyer, such as disclosed in my application No. 711,137 filed July 23, 1912, for improvements in conveyers, it is only necessary to change the supporting structure in those particulars which would adapt it to the special work to be done, and the operating mechanism with other suitable changes may be applied, wherever it is desirable to obtain a long reciprocatory movement from a rotary movement, such reciprocatory movement being much longer than is possible to obtain from a crank or like structure.

What is claimed is:—

1. In a device for the purpose described, a supporting means, spaced guides mounted therein, a frame spanning the space between the guides and provided with elongated terminal members formed separate from and secured to the frame and movable along the guides in coactive relation thereto, said frame being relatively thin and flat and of substantially rectangular form permanently closed at the ends and having a centralized offset yoke with gaps through the frame leading into said yoke and through the side of the frame opposite the yoke, a traveler mounted in the frame in embracing relation to opposite faces of the frame where engaging it to move lengthwise of the frame and be guided thereby, said traveler being composed of separate connected members on opposite sides of and extending through the frame, endless drive members for the traveler and frame connected to the traveler and arranged on opposite sides of the frame and movable in the direction of travel of the latter, and means for imparting continuous movement to the drive members to cause reciprocatory movements of the frame and comprising spaced supports for the drive members, and a drive shaft in the path of the frame and so located as to enter the gaps of the frame at one limit of reciprocation of the latter.

2. In a device for the purpose described, a supporting frame, a drive shaft mounted in the frame near one end thereof and in traversing relation to the frame, sprocket wheels mounted on the drive shaft in spaced relation one to the other, idler sprocket wheels similarly spaced and distant from the first-named sprocket wheels toward the other end of the frame, each idler sprocket wheel being mounted on a shaft individual thereto and said shaft having adjustable bearings for moving the idler sprocket wheels toward and from the first-named sprocket wheels, endless sprocket chains mounted on respective driving and idler sprocket wheels, a wrist pin connected to both chains, guide rods mounted in the main frame on opposite sides of the shafts carrying the sprocket wheels, a reciprocatory frame having at the ends guiding sleeves mounted on the guide rods, and having intermediate gaps in its side members with one side member connected by a bridging yoke to permit the last named frame to move transversely of the drive shaft, and a traveler mounted in the last named frame for movement lengthwise thereof and traversed by the wrist pin carried by the sprocket chains. the last named frame having the inner edges of its long sides of V shape and the traveler having the corresponding edges provided with similarly shaped grooves to receive the V-shaped edges of the last-named frame.

3. In a device for the purpose described, an elongated substantially flat rectangular frame having the ends permanently closed and provided with intermediate gaps in its long sides with a yoke extending laterally from one long side and bridging the gap therein, and a traveler lodged in the frame and of a length to bridge the gaps and move lengthwise of the frame, said traveler being formed of separate connected parts applied to opposite sides of the frame in embracing relation to the inner long edges thereof, said inner long edges being of V-shape and the traveler having the corresponding portions of the parts applied to opposite sides of the frame shaped to together form V grooves for receiving the V edges of the frame.

In testimony, that I claim the foregoing as my own, I have hereto affixed my signature in the presence of two witnesses.

AUGUST SWANSON.

Witnesses:
JOSEPH PEACOCK,
M. L. BASEMANN.